(12) United States Patent
Li et al.

(10) Patent No.: US 11,530,958 B2
(45) Date of Patent: Dec. 20, 2022

(54) INTELLIGENT OPTICAL FIBER TACTILE SOUNDING SYSTEM AND METHOD THEREOF

(71) Applicant: SHANDONG UNIVERSITY OF SCIENCE AND TECHNOLOGY, Qingdao (CN)

(72) Inventors: Lijun Li, Qingdao (CN); Tianzong Xu, Qingdao (CN); Qian Ma, Qingdao (CN); Zhaochuan Zhang, Qingdao (CN); Jiajun Shen, Qingdao (CN)

(73) Assignee: SHANDONG UNIVERSITY OF SCIENCE AND TECHNOLOGY, Qingdao (CN)

( * ) Notice: Subject to any disclaimer, the term of this patent is extended or adjusted under 35 U.S.C. 154(b) by 0 days.

(21) Appl. No.: 17/633,083

(22) PCT Filed: Aug. 11, 2021

(86) PCT No.: PCT/CN2021/111981
§ 371 (c)(1),
(2) Date: Feb. 4, 2022

(87) PCT Pub. No.: WO2022/048413
PCT Pub. Date: Mar. 10, 2022

(65) Prior Publication Data
US 2022/0299387 A1   Sep. 22, 2022

(30) Foreign Application Priority Data
Sep. 3, 2020   (CN) .......................... 2020109126119

(51) Int. Cl.
*G01L 1/24* (2006.01)
*G06F 3/16* (2006.01)
*B25J 13/08* (2006.01)

(52) U.S. Cl.
CPC .............. *G01L 1/242* (2013.01); *G06F 3/165* (2013.01); *B25J 13/084* (2013.01)

(58) Field of Classification Search
CPC ......... G01L 1/242; G01H 9/004; G06F 3/165; B25J 13/084
(Continued)

(56) References Cited

U.S. PATENT DOCUMENTS 4,699,513 A * 10/1987 Brooks ................ G02B 6/2861
  902/4
5,555,086 A *  9/1996 vonBieren ......... G01D 5/35383
  250/227.27
(Continued)

FOREIGN PATENT DOCUMENTS

CN   102549531 A   7/2012
CN   109405759 A   3/2019
(Continued)

OTHER PUBLICATIONS

Search Report issued in corresponding Chinese Application No. 2020109126119; dated Sep. 7, 2021; 5 pgs.
(Continued)

*Primary Examiner* — Octavia Davis Hollington
(74) *Attorney, Agent, or Firm* — Hauptman Ham, LLP (57) ABSTRACT

An intelligent optical fiber tactile sounding system and a method thereof, and belongs to the field of intelligent optical fiber sensing. The system includes a flexible optical fiber tactile sensing array, a photoelectric detection system, an intelligent pressure analysis software and an acoustic emission system; a small-scale distributed tactile sensing array is constructed by embedding a fiber-core mismatched optical fiber interferometric sensor into a flexible substrate material and performing sensing region division for an asymmetrical structure with an optical fiber structure as a delimiting line;
(Continued)

a tactile sensor transmits tactile signals to the photoelectric detection system in the form of optical signals, the photoelectric detection system inputs these pressure signals into the intelligent pressure analysis software to determine a region and a size of a tactile source, and then sends an instruction to the acoustic emission system to enable the acoustic emission system to emit different sounds.

3 Claims, 5 Drawing Sheets

(58) Field of Classification Search
USPC .......................................................... 704/270
See application file for complete search history.

(56) References Cited

U.S. PATENT DOCUMENTS

| | | | | |
|---|---|---|---|---|
| 6,816,266 | B2* | 11/2004 | Varshneya | A61B 5/113 356/477 |
| 9,770,862 | B2* | 9/2017 | Swinehart | B05D 3/002 |
| 2015/0141854 | A1* | 5/2015 | Eberle | A61B 5/02154 600/488 |
| 2019/0390985 | A1* | 12/2019 | Kwok | G01L 1/246 |

FOREIGN PATENT DOCUMENTS

| | | |
|---|---|---|
| CN | 109405761 A | 3/2019 |
| CN | 209027476 U | 6/2019 |
| CN | 209147941 U | 7/2019 |
| CN | 112229549 A | 1/2021 |
| WO | WO-2012140411 A1 * 10/2012 | ......... G01B 9/02023 |
| WO | WO-2022052724 A1 * 3/2022 | ......... G01D 5/35306 |

OTHER PUBLICATIONS

First Office Action issued in corresponding Chinese Application No. 2020109126119; dated Sep. 10, 2021; 14 pgs.
Notice of Grant issued in corresponding Chinese Application No. 2020109126119; dated Nov. 25, 2021; 4 pgs.
International Search Report and Written Opinion issued in corresponding International Application No. PCT/CN2021/111981; dated Nov. 17, 2021; 18 pgs.

* cited by examiner

INTELLIGENT OPTICAL FIBER TACTILE SOUNDING SYSTEM AND METHOD THEREOF

RELATED APPLICATIONS

The present application is a U.S. National Phase of International Application Number PCT/CN2021/111981 filed Aug. 11, 2021, and claims priority to Chinese Application Number 2020109126119 filed Sep. 3, 2020.

TECHNICAL FIELD

The present invention belongs to the field of intelligent optical fiber sensing, and more particularly relates to an intelligent optical fiber tactile sounding system and a method thereof applicable for robots, and the like to implement functions such as verbal communication or voice prompt or alarm by converting pressure and position information into acoustic signals.

BACKGROUND

With continuous advance of scientific technology, human society has entered an era of intelligence and automation. To satisfy requirements of social production and keep pace with a trend of era development, a large number of sensors are widely used in different fields such as industrial manufacturing, sea monitoring, environmental protection, medical surgeries, bioengineering and intelligent homes. To a certain extent, the sensor has already become a key component for determining system characteristics and performance indexes. A flexible sensor is made of a flexible material and has advantages such as transparency, softness, bend resistance and wearability, and can flexibly complete a measurement task of a physical quantity in a complex region. Therefore, it has a broad application prospect in the fields such as medical health, intelligent sports, robot "skin", Internet of Things and artificial intelligence.

Figure 1:
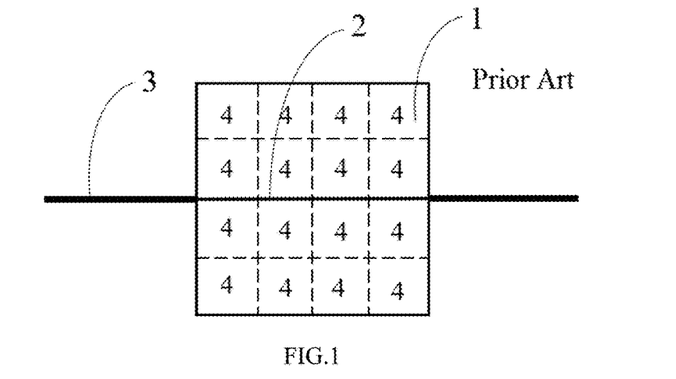
FIG. 1 is a schematic diagram briefly illustrating a mounting position relationship between an optical fiber sensor and a flexible substrate material in the prior art.

In an optical fiber mounting method of an intelligent optical fiber tactile sensing system in the prior art, as shown in FIG. 1, if an optical fiber is mounted along a center line of a substrate based on a conventional method in an actual operation, when a pressure is uniformly applied to a force receiving position respectively, positions to which a force is applied cannot be distinguished since upper and lower sides of the optical fiber receive a same force. The present invention provides an intelligent optical fiber tactile sounding system that implements a one-sensor multi-point multi-pressure detection function by embedding a fiber-core mismatched optical fiber interferometric sensor with an asymmetrical structure into a substrate made of a flexible material.

The intelligent optical fiber tactile sounding system is particularly applicable to tactile sensing of robots, and so on, such that the robot etc. can not only identify a pressure and a contact position, but also can convert information such as pressure into an acoustic signal, so as to implement functions such as verbal communication or voice prompt or alarm, where the acoustic signal may implement functions such as sounding of single-word and combined statement in different encoding manners. The present invention has advantages of compact structure, high sensitivity, automatic identification of pressure and contact position, ability to convert tactile sense into acoustic signals, and ease of implementation, and the like, and therefore can be applied to intelligent robots, medical assistance, safety protection, life nursing, and so on.

SUMMARY

To solve the problems of the intelligent optical fiber tactile sensing by which the tactile sense is converted into acoustic signals, the present invention provides an intelligent optical fiber tactile sounding system and a method thereof that can identify information such as pressure and contact position and convert pressure into acoustic signals.

To achieve a first object described above, the present invention adopts the following technical solution.

An intelligent optical fiber tactile sounding system includes a flexible optical fiber tactile sensing array, a photoelectric detection system, an intelligent pressure analysis software and an acoustic emission system. The optical fiber tactile sensing array is constructed by embedding a fiber-core mismatched optical fiber interferometric sensor with an asymmetrical structure into a flexible substrate material, and performing region division on the flexible substrate material around an optical fiber sensor; the photoelectric detection system records spectral information output by the sensor, identifies and determines the spectral information by the intelligent pressure analysis software, and then sends an instruction to drive a hardware to generate sound.

Further, the flexible optical fiber tactile sensing array is manufactured through the following steps.

At step a, polydimethylsiloxane (PDMS) or silica gel is used as the flexible substrate material, and a fiber-core mismatched optical fiber interferometric sensor is selected.

At step b, the above flexible substrate material is pre-treated.

At step c, the fiber-core mismatched optical fiber interferometric sensor is placed while overlapping with a center line of a mould is avoided, where a distance between each end of the fiber-core mismatched optical fiber interferometric sensor and the center line is d; and then, the flexible substrate material is placed in the mould, where, without considering a specific value of d, the fiber-core mismatched optical fiber interferometric sensor is slantly placed in the flexible substrate material in such a way that both sides with the sensing optical fiber as a delimiting line will not be symmetric.

At step d, the mould at step c is placed into a thermostat for curing to package the fiber-core mismatched optical fiber interferometric sensor in the flexible substrate, and an optical fiber outlet is protected with a plastic cover.

At step e, with the fiber-core mismatched optical fiber interferometric sensor as a sensing element, a distributed tactile sensor is constructed on the flexible substrate by performing region division.

Further, the optical fiber is an optical fiber of a fiber-core mismatched Mach-Zehnder interference structure.

To achieve a second object described above, the present invention adopts the following technical solution.

An intelligent optical fiber tactile sounding method using the intelligent optical fiber tactile sounding system as described above includes the following steps.

At step 1, a pressure is applied to each multi-tactile sensitive region of the distributed tactile sensor to change an interference spectrum of an internal sensing structure, and the fiber-core mismatched optical fiber interferometric sensor transmits the spectral change to the photoelectric detection system in the form of interferometric optical signals.

At step 2, the photoelectric detection system stores these pressure signals in the form of digital signals and inputs these pressure signals into the intelligent pressure analysis software.

At step 3, the intelligent pressure analysis software determines a region and a size of a tactile source, and then sends an instruction to the acoustic emission system to enable the acoustic emission system to emit different sounds.

Further, in the intelligent optical fiber tactile sounding method, an output light intensity of the fiber-core mismatched optical fiber interferometric sensor at step 1 is as follows:

$$I = I_{co} + I_{cl} + 2\sqrt{I_{co}I_{cl}} \cos \Delta\varphi;$$

in the above formula, $I_{co}$ and $I_{cl}$ refer to transmission light intensities of a fiber core and a cladding respectively, and $\Delta\varphi$ refers to a phase difference; and a strain sensitivity of the optical fiber MZI is as follows:

$$\Delta\lambda/\varepsilon = \lambda\left(1 - \frac{P_e^{core} n_{eff}^{core} - P_e^{clad} n_{eff}^{clad}}{\Delta n_{eff}}\right);$$

in the above formula, $P_e^{core}$ and $P_e^{clad}$ refer to effective photoelastic coefficients (positive values) of the optical fiber core and the cladding respectively, $\lambda$ refers a propagation wavelength of an optical wave in the optical fiber, $\Delta\lambda$ refers to a wavelength drift amount, s refers to an axial strain, $n_{eff}^{core}$ and $n_{eff}^{clad}$ refer to effective refractive indexes of a fiber core mode and a cladding mode respectively, and $\Delta n_{eff}$ refers to a change of the effective refractive index.

Further, in the intelligent optical fiber tactile sounding method, the acoustic signal implements functions such as sounding of single-word and combined statement in different encoding manners so as to achieve functions such as verbal communication or voice prompt or alarm.

The present invention brings about the following beneficial effects.

The present invention is particularly applicable to tactile sensing of robots, and so on, to identify pressure and contact position, and convert information such as pressure into acoustic signal, so as to implement functions such as verbal communication or voice prompt or alarm, where the acoustic signal may implement functions such as sounding of single-word and combined statement in different encoding manners. The present invention has advantages of compact structure, high sensitivity, automatic identification of pressure and contact position, ability to convert tactile sense into acoustic signals, and ease of implementation, and the like, and may be applied to intelligent robots, medical assistance, safety protection, life nursing, and so on.

1—flexible substrate material; 2—fiber-core mismatched optical fiber interferometric sensor; 3—plastic cover; 4—multi-tactile sensitive region; 5—optical fiber sensor; 6—optical fiber outlet; 7—the mould; 8—PDMS material; 9—optical fiber; 10—distributed tactile sensor.

DETAILED DESCRIPTION OF THE EMBODIMENTS

Specific implementations of the present invention will be further described below in combination with accompanying drawings and specific embodiments.

Figure 2:
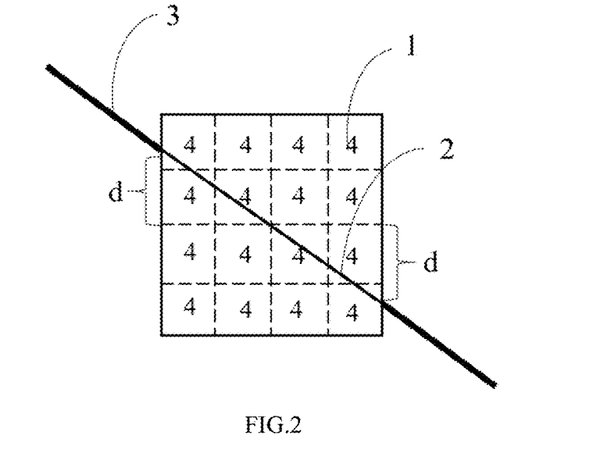
FIG. 2 is a schematic diagram briefly illustrating a mounting position relationship between a fiber-core mismatched optical fiber interferometric sensor and a flexible substrate material in the present invention.

An intelligent optical fiber tactile sounding system includes a flexible optical fiber tactile sensing array, a photoelectric detection system, an intelligent pressure analysis software and an acoustic emission system. As shown in FIG. 2, the flexible optical fiber tactile sensing array includes a flexible substrate material 1, a fiber-core mismatched optical fiber interferometric sensor 2, a plastic cover 3 and a tactile sensitive region 4, and is manufactured through the following steps.

At step a, polydimethylsiloxane (PDMS) or silica gel is used as the flexible substrate material, and the fiber-core mismatched optical fiber interferometric sensor 2 is selected.

At step b, the above flexible substrate material is pre-treated.

Figure 7:
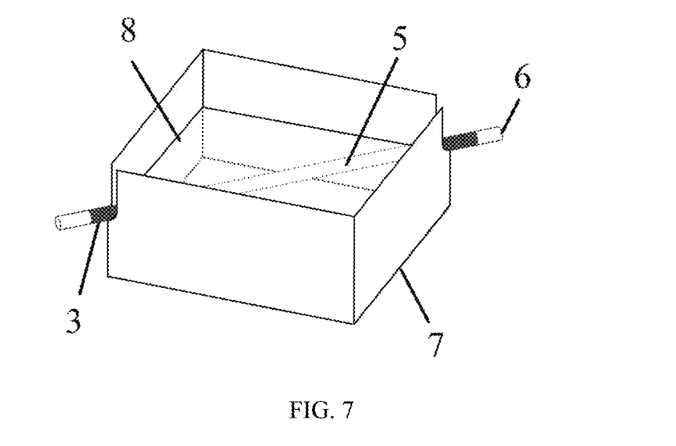
FIG. 7 is a schematic diagram of the mold structure in the present invention.

At step c, the fiber-core mismatched optical fiber interferometric sensor 2 is placed while overlapping with a center line of a mould is avoided, where a distance between each end of the fiber-core mismatched optical fiber interferometric sensor 2 and the center line is d; and then, the flexible substrate material 1 is placed in the mould, where without considering a specific value of d, the fiber-core mismatched optical fiber interferometric sensor 2 is slantly placed in the flexible substrate material 1 in such a way that both sides with the sensing optical fiber as a delimiting line will not be symmetric.

At step d, the mould at step c is placed in a thermostat for curing to package the fiber-core mismatched optical fiber interferometric sensor 2 in the flexible substrate 1, and an optical fiber outlet is protected with the plastic cover 3.

Figure 8:
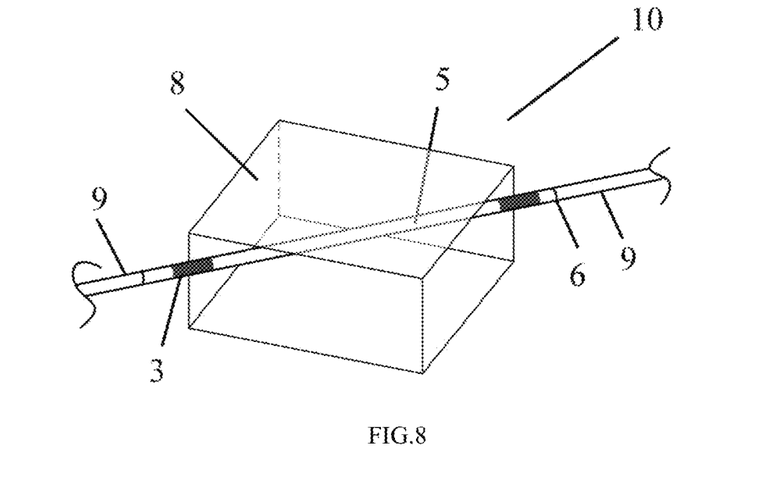
FIG. 8 is distributed tactile sensor structural diagram in the present invention.

At step e, with the fiber-core mismatched optical fiber interferometric sensor 2 as a sensing element, a distributed tactile sensor is constructed on the flexible substrate 1 by performing region division.

Specifically, the optical fiber is an optical fiber of a fiber-core mismatched Mach-Zehnder interference structure.

Figure 3:
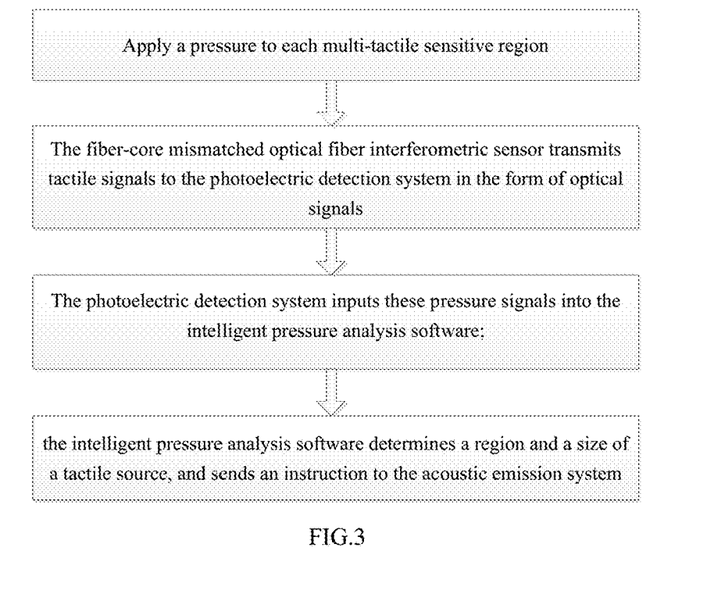
FIG. 3 is a flowchart of converting a pressure into an acoustic signal by a fiber-core mismatched optical fiber interferometric sensor in the present invention.
Figure 4A:
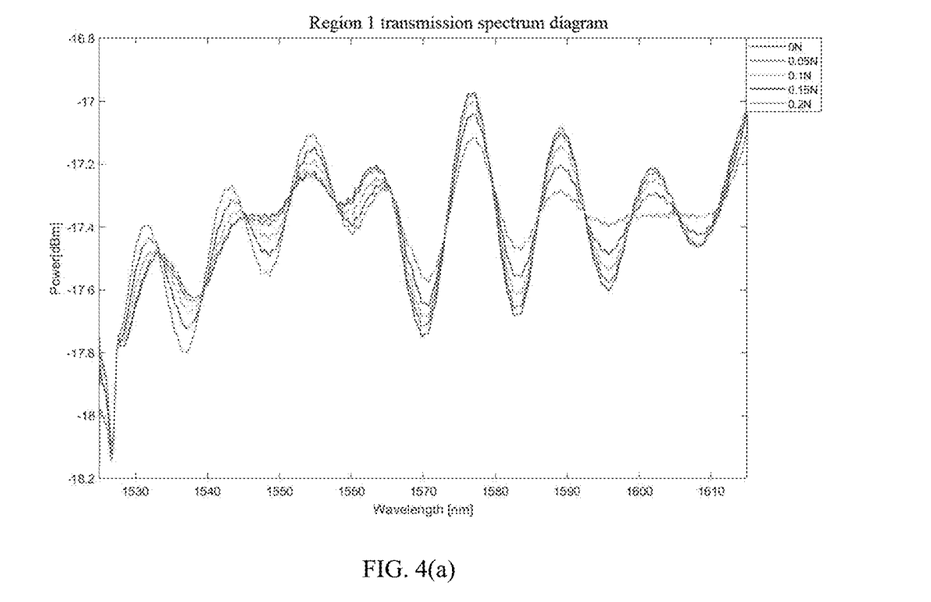
FIGS. 4(a)-4(d) are a transmission spectrum diagram of an actual measurement force in the present invention, in which FIGSs. 4(a), 4(b), 4(c) and 4(d) are transmission spectrum diagrams of four regions named in a clockwise direction in a flexible skin center respectively.
Figure 4B:
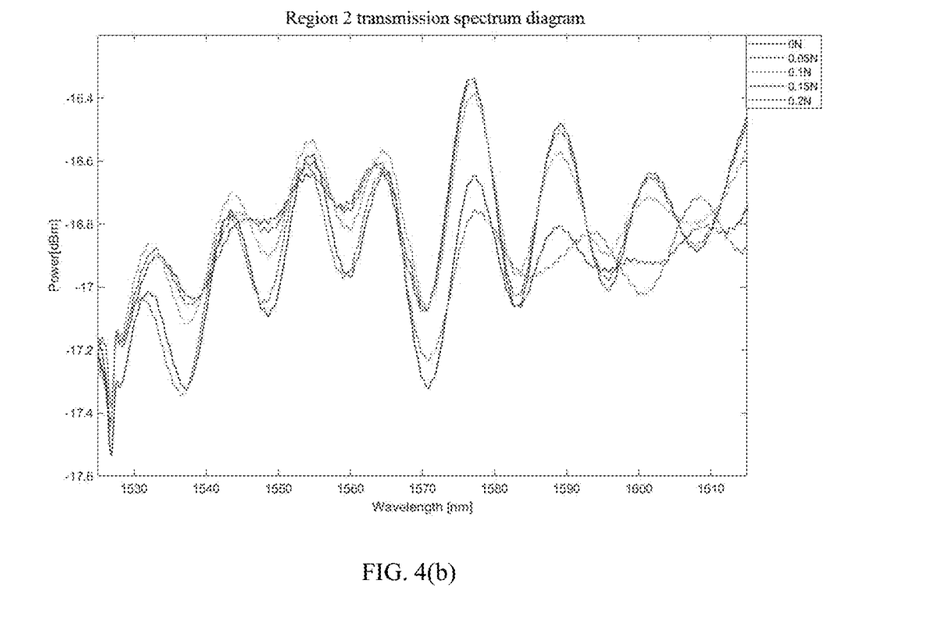
Figure 4C:
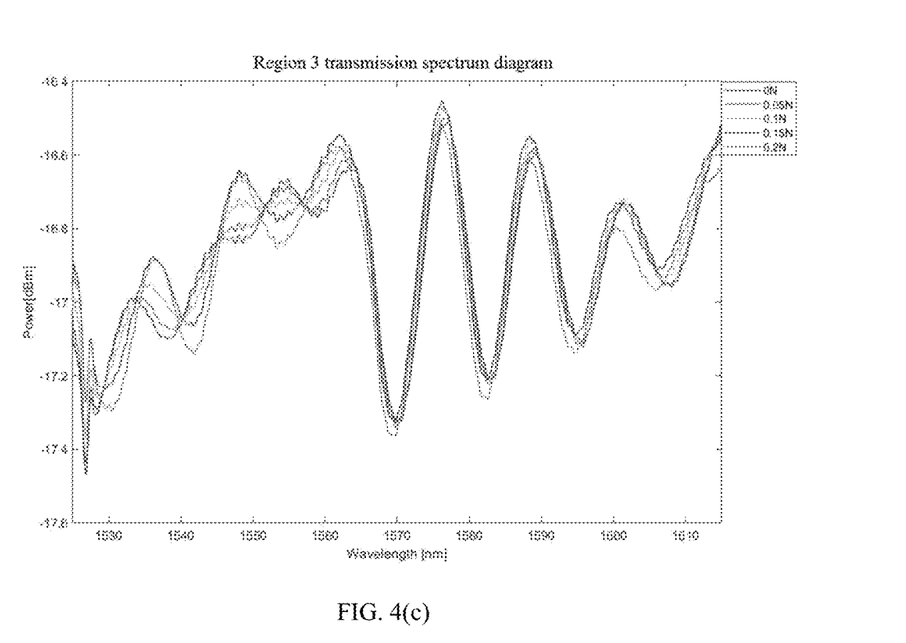
Figure 4D:
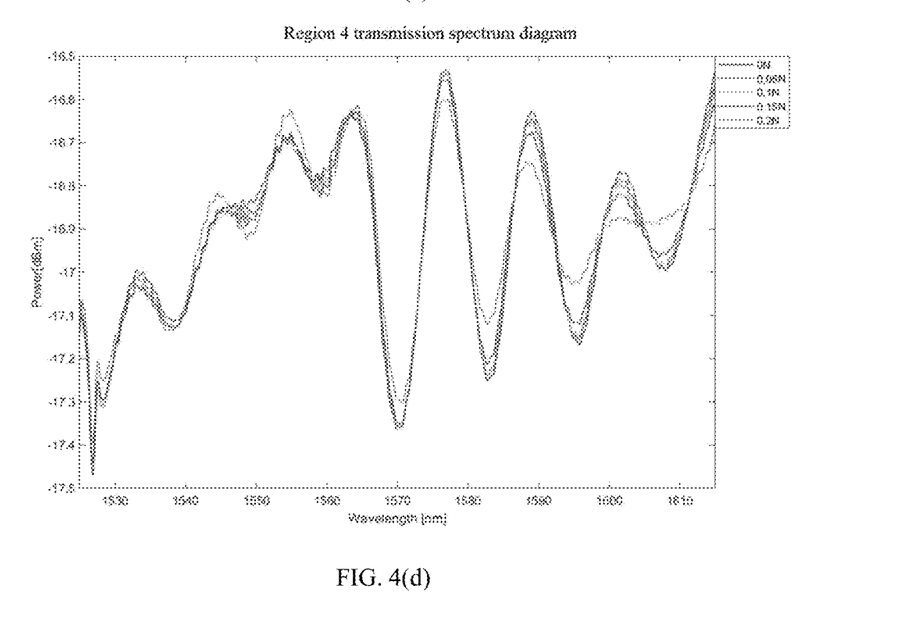
Figure 5:
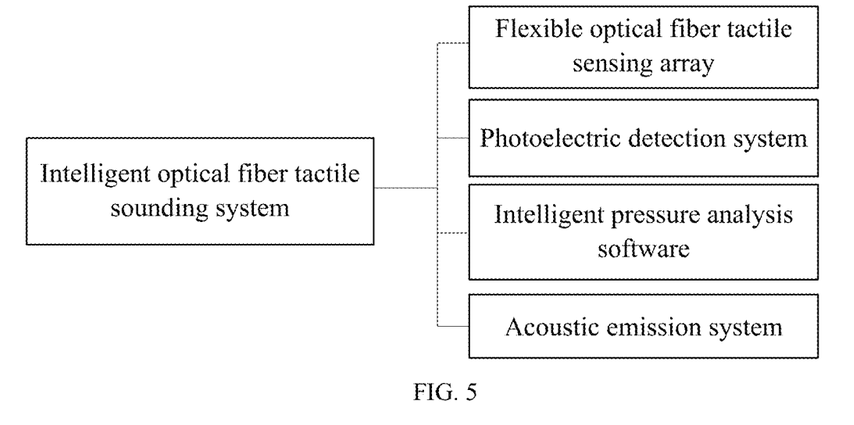
FIG. 5 is a schematic diagram of intelligent optical fiber tactile sounding system in the present invention.
Figure 6:
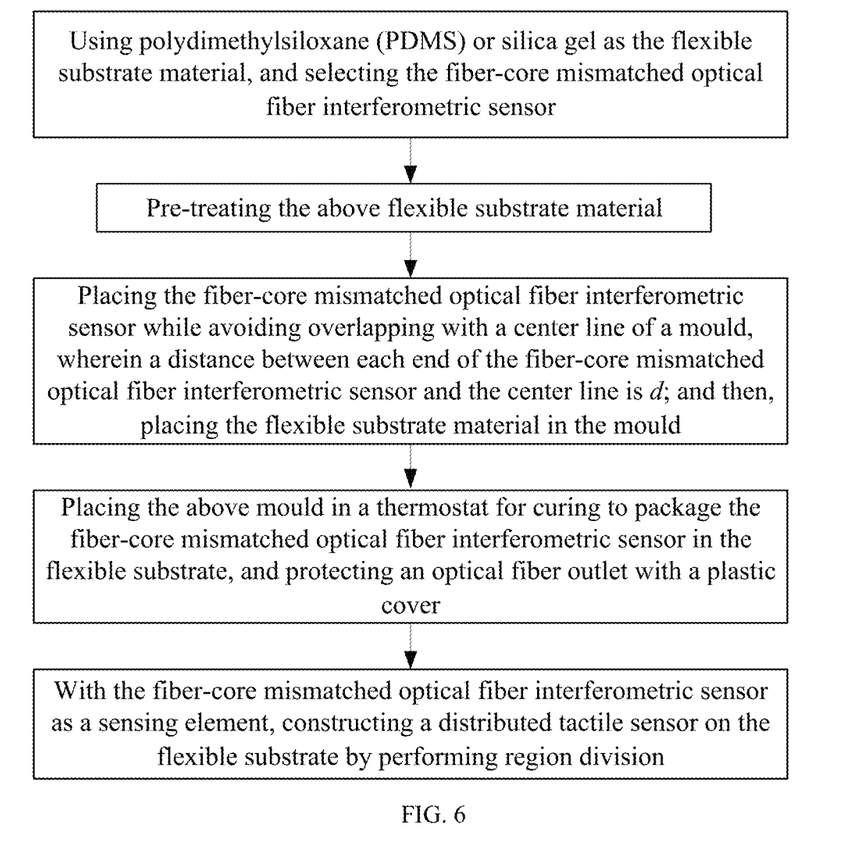
FIG. 6 is a flow chart of manufacturing a flexible optical fiber tactile sensing array in the present invention.

Further, as shown in FIG. 3, an intelligent optical fiber tactile sounding method using the intelligent optical fiber tactile sounding system as described above includes the following steps.

At step 1, a pressure is applied to each multi-tactile sensitive region 4 of the distributed tactile sensor to change interference spectrum of an internal sensing structure, and the fiber-core mismatched optical fiber interferometric sensor 2 transmits the spectral change to the photoelectric detection system in the form of interferometric optical signals.

At step 2, the photoelectric detection system stores these pressure signals in the form of digital signals and inputs these pressure signals into the intelligent pressure analysis software.

At step 3, the intelligent pressure analysis software determines a region and a size of a tactile source, and then sends an instruction to the acoustic emission system to enable the acoustic emission system to emit different sounds.

Specifically, in the intelligent pressure analysis software, identification training is performed by selecting a mode identification tool in a neural network toolbox, where an activation function of a hidden layer is a sigmoid function, and an activation function of an output layer is a softmax function.

Specifically, at step 1, after an optical wave passes through the optical fiber with a length being L, a phase delay of the emitted optical wave is expressed as follows:

$$\phi = k_0 nL = \frac{2\pi}{\lambda}L = \beta L;$$

where, $k_0$ refers to a propagation coefficient of light in vacuum, n refers to a refractive index of a propagation path, L is a length of the propagation path, $\beta=2\pi/\lambda$ refers to a propagation constant of the optical wave in the optical fiber, $\lambda=\lambda_0/n$ refers to a propagation wavelength of the optical wave in the optical fiber, and $\lambda_0$ refers to a propagation wavelength of the optical wave in vacuum.

Under the actions of external factors, a phase change of the optical wave may be written in the following form:

$$\Delta\phi = \beta\Delta L + L\Delta\beta = \beta L\frac{\Delta L}{L} + L\frac{\partial \beta}{\partial D}\Delta D;$$

where, D refers to a diameter of the optical fiber core.

It can be seen from the above formula that the pressure may cause change of three phase modulation factors, i.e. a change of the length of the optical fiber ($\Delta L$), a change of a diameter of the optical fiber ($\Delta D$) and a change of the refractive index ($\Delta n$).

When a longitudinal strain is elongated, a transverse strain is shortened; when the longitudinal strain is shortened, the transverse strain is elongated; the longitudinal strain and the transverse strain have opposite signs, conform to the Hooke's law $|\varepsilon_1/\varepsilon_3|=\nu$, and $\varepsilon_1=\varepsilon_2$, where $\nu$ is a constant referred to as Poisson's ratio, $\varepsilon_1$ and $\varepsilon_2$ are transverse strains of the optical fiber, $\varepsilon_3$ refers to the longitudinal strain of the optical fiber, and $P_{11}$ and $P_{12}$ refer to photoelastic coefficients of the optical fiber. Thus, $$\Delta\phi = nk_0 L\left\{1 - \frac{1}{2}n^2[(1-\nu)P_{12} - \nu P_{11}]\right\}\varepsilon_3 - LD\nu\frac{\partial \beta}{\partial D}\varepsilon_3.$$

In a single-mode optical fiber, a phase change resulting from a change of the diameter of the optical fiber is generally negligible, Therefore, a common strain formula of the single-mode optical fiber is as follows:

$$\Delta\phi = nk_0 L\left\{1 - \frac{1}{2}n^2[(1-\nu)P_{12} - \nu P_{11}]\right\}\varepsilon_3 = \frac{2\pi n\xi\Delta L}{\lambda_0};$$

where, $$\xi = 1 - \frac{1}{2}n^2[(1-\nu)P_{12} - \nu P_{11}]$$

is referred to as a strain coefficient of the optical fiber.

A phase difference φ of a full optical fiber Inline MZI based on mode excitation and coupling may be expressed as follows:

$$\varphi = \frac{2\pi}{\lambda}\Delta n_{eff}L = \frac{2\pi}{\lambda}\left(n_{eff}^{core} - n_{eff}^{clad}\right)L;$$

where, $n_{eff}^{core}$ $n_{eff}^{clad}$ refer to effective refractive indexes of a fiber core mode and a cladding mode respectively, $\Delta n_{eff}$ refers to a change of the effective refractive index, and L refers to a distance between two coupling units, that is, an interference length.

A spacing between interferometric fringes may be expressed as follows:

$$S = \frac{\lambda^2}{\Delta n_{eff}L}.$$

By combining the above two equations, a wavelength drift amount (a change of the fringe spacing along with the strain is ignored in a derivation process) may be obtained as follows:

$$\Delta\lambda = \frac{S\Delta\varphi}{2\pi} = \frac{\lambda^2}{\Delta n_{eff}L}\frac{\Delta\varphi}{2\pi}.$$

The used wavelength has a very small range, a dispersion effect of the optical fiber material itself is ignored simultaneously, and only a change amount of the phase difference due to an axial strain is considered. Thus, $\Delta\varphi$ may be expressed as follows:

$$\Delta\varphi = \frac{2\pi}{\lambda}[\Delta n_{eff}\Delta L + \Delta(\Delta n_{eff})L]$$
$$= \frac{2\pi}{\lambda}[\Delta n_{eff}\Delta L + (\Delta n_{eff}^{core} - \Delta n_{eff}^{clad})L]$$
$$= \frac{2\pi}{\lambda}[\Delta n_{eff}\Delta L - (P_e^{core}n_{eff}^{core}\varepsilon - P_e^{clad}n_{eff}^{clad}\varepsilon)L];$$

where, $P_e^{core}$ and $P_e^{clad}$ refer to photoelastic coefficients (positive values) of the optical fiber core and the cladding respectively, and ε refers to the axial strain.

Finally, the strain sensitivity of the optical fiber MZI may be derived as follows:

$$\Delta\lambda/\varepsilon = \lambda\left(1 - \frac{P_e^{core}n_{eff}^{core} - P_e^{clad}n_{eff}^{clad}}{\Delta n_{eff}}\right) < 0.$$

It can be known from the above formula that, the interferometric fringe linearly changes along with the strain, and the higher the order of the cladding mode excited by the coupling unit is, the larger the strain sensitivity is.

By applying the intelligent optical fiber tractile sounding system of the present invention, it is preliminarily verified that the feasibility of the actual measurement can be described by an ANSYS simulation cloud diagram illustrating a force received by the system. FIGS. 4(a)-4(d) is a transmission spectrum diagram of the actual measurement force, which verifies the feasibility of the actual measurement.

The foregoing is a complete implementation process of this embodiment.

Certainly, the above descriptions are not intended to limit the present invention, and the present invention is also not limited to the above embodiments. Changes, modifications, additions or substitutions made by those skilled in the art within the essence of the present invention shall also be encompassed in the scope of protection of the present invention.

The invention claimed is:

1. An intelligent optical fiber tactile sounding system, comprising a flexible optical fiber tactile sensing array, a photoelectric detection system, an intelligent pressure analysis software and an acoustic emission system, wherein the optical fiber tactile sensing array is constructed by embedding a fiber-core mismatched optical fiber interferometric sensor with an asymmetrical structure into a flexible substrate material, and performing region division on the flexible substrate material around an optical fiber sensor; and the photoelectric detection system records spectral information output by the fiber-core mismatched optical fiber interferometric sensor, identifies and determines the spectral information by the intelligent pressure analysis software, and then sends an instruction to drive a hardware to generate sound;

the flexible optical fiber tactile sensing array is manufactured through the following steps:

at step a, using polydimethylsiloxane (PDMS) or silica gel as the flexible substrate material, and selecting the fiber-core mismatched optical fiber interferometric sensor;

at step b, pre-treating the above flexible substrate material;

at step c, placing the fiber-core mismatched optical fiber interferometric sensor while avoiding overlapping with a center line of a mould, wherein a distance between each end of the fiber-core mismatched optical fiber interferometric sensor and the center line is d; and then, placing the flexible substrate material in the mould;

at step d, placing the mould at step c in a thermostat for curing to package the fiber-core mismatched optical fiber interferometric sensor in the flexible substrate material, and protecting an optical fiber outlet with a plastic cover; and at step e, with the fiber-core mismatched optical fiber interferometric sensor as a sensing element, constructing a distributed tactile sensor on the flexible substrate material by performing region division;

wherein an intelligent optical fiber tactile sounding method using the intelligent optical fiber tactile sounding system, comprising the following steps:

at step 1, applying a pressure to each of multi-tactile sensitive regions of the distributed tactile sensor to change interference spectrum of an internal sensing structure, and transmitting, by the fiber-core mismatched optical fiber interferometric sensor, the spectral change to the photoelectric detection system in the form of optical signals;

at step 2, storing, by the photoelectric detection system, these pressure signals in the form of digital signals, and inputting these pressure signals into the intelligent pressure analysis software; and at step 3, determining, by the intelligent pressure analysis software, a region and a size of a tactile source, and sending an instruction to the acoustic emission system to enable the acoustic emission system to emit different sounds;

wherein an output light intensity of the fiber-core mismatched optical fiber interferometric sensor at step 1 is as follows:

$$I = I_{co} + I_{cl} + 2\sqrt{I_{co}I_{cl}} \cos \Delta\varphi;$$

where, $I_{co}$ and $I_{cl}$ refer to transmission light intensities in an optical fiber core and a cladding respectively, and $\Delta\varphi$ refers to a phase difference; and a strain sensitivity of an optical fiber MZI is as follows:

$$\Delta\lambda/\varepsilon = \lambda\left(1 - \frac{P_e^{core} n_{eff}^{core} - P_e^{clad} n_{eff}^{clad}}{\Delta n_{eff}}\right);$$

where, $P_e^{core}$ and $P_e^{clad}$ refer to effective photoelastic coefficients (positive values) of the optical fiber core and the cladding respectively, $\lambda$ refers a propagation wavelength of an optical wave in an optical fiber, $\Delta\lambda$ refers to a wavelength drift amount, $\varepsilon$ refers to an axial strain, $n_{eff}^{core}$ and $n_{eff}^{clad}$ refer to effective refractive indexes of a fiber core mode and a cladding mode respectively, and $\Delta n_{eff}$ refers to a change of the effective refractive index.

2. The intelligent optical fiber tactile sounding system of claim 1, wherein the optical fiber has a fiber-core mismatched Mach-Zehnder interference structure.

3. The intelligent optical fiber tactile sounding method of claim 1, wherein an acoustic signal implements sounding functions of single-word and combined statement in different encoding manners.

* * * * *